Oct. 4, 1938.　　　　　G. A. LOCKE　　　　　2,132,213
RECORDER OF LIQUID LEVEL HEIGHTS
Filed March 12, 1936　　　4 Sheets-Sheet 1

INVENTOR
G. A. LOCKE
BY
J. W. Schmied
ATTORNEY

Patented Oct. 4, 1938

2,132,213

UNITED STATES PATENT OFFICE 2,132,213

RECORDER OF LIQUID LEVEL HEIGHTS

George A. Locke, Glenwood Landing, N. Y., assignor to Bell Telephone Laboratories, Incorporated, New York, N. Y., a corporation of New York Application March 12, 1936, Serial No. 68,378

8 Claims. (Cl. 73—313)

This invention relates primarily to liquid level indicators of the float-operated type and more particularly to means for making at a remote point a permanent record of the changes in liquid levels.

An object of the invention is to transmit in code from a reservoir or dam to a remote observing point at predetermined intervals signal impulses corresponding to the height of the level of liquid stored in the reservoir or similar source of liquid supply.

Another object is to translate at the remote point the signal impulses transmitted from the reservoir into a code effective to operate a teletypewriter.

According to the present invention there is provided a float-operated measuring device wherein the float in rising and falling with the water level may cause to rotate a drum having seven rings attached coaxially but insulated from each other. The cylindrical surface of each ring is divided into segments and spaces, there being on one of the rings as many segments and spaces, alternately arranged, as there are feet or steps of water level to be recorded. The segments and spaces of each ring differ in number from the segments and spaces of the other rings. Seven aligned segments and spaces during each step of the drum are arranged to be simultaneously in engageable relation with seven contact brushes, respectively, so that for each set of aligned segments and spaces it is possible to establish by means of the brushes one to seven circuits depending on whether or not the brushes are in actual engagement with the segments of their respective rings. Each alignment of segments and spaces is capable of causing a signal of seven impulses to be transmitted. A rotary selector switch of the type movable in one direction only and located at the reservoir causes the impulses of each signal to be transmitted successively. The selector switch is operated in steps by a pulsating current received from the distant observing point which current is transmitted at predetermined intervals depending on how frequently the water level information is desired. A second rotary selector switch which is located at the remote observing point and is of the same type as that at the reservoir is simultaneously operated by the pulsating current and is effective to direct the impulses of each signal transmitted from the reservoir to seven electromagnets, respectively, at the remote point. The seven electromagnets in response to the impulses received from the reservoir cause the measurement of the water level to be received on a meter. The meter is of the type wherein the indicator is operated by a coil rotatable by steady currents of variable amplitudes established over a circuit having parallel, variably resistive paths extending to a source of current over closed contacts of those electromagnets which are operated by impulses of current received from the reservoir. The indicator is arranged in operating to cause a drum at the observing point to rotate in either direction through any part of a complete revolution. The drum comprises fifteen rings coaxially arranged with and insulated from each other. Each ring is divided into segments and spaces somewhat similar to the drum that is located at the reservoir. During each step of the fifteen ring drum there are respectively arranged in engageable relation with the fifteen segments and spaces, fifteen contact brushes, or three groups of five. The five segments of each group are capable of causing to be transmitted five impulses of the signal combination for operating a teletypewriter and the three groups are provided for furnishing the three digits of a number constituted of units, tens and hundreds. The three groups of five impulses each are respectively transmitted to three groups of five electromagnets. Certain electromagnets of each group are operated and circuits closed by them are connected through the closed contacts of a second rotary switch at the remote observing point. The operation of one or more electromagnets of each group is effected to operate the corresponding selector magnets of a printer to thereby cause to be printed the corresponding character at the printer. The stepping operation of the second rotary switch allows the circuits closed by the operation of the electromagnets of each group to cause the printing of each character of the recorded number separately.

The objects and advantages of the invention will be better understood from the following detailed description thereof when read in conjunction with the accompanying drawings in which:

Fig. 1-A shows developed the surface of the cylindrical drum mounted on the right end of the driving shaft of Fig. 1;

Fig. 1-B shows a fragmentary view of a cross section taken at the section lines B—B in Fig. 1-A;

Fig. 2-A shows a developed section of the drum which transmits the request signals from the central office. The drum is shown in the lower left-hand corner of Fig. 2;

Fig. 5-A shows a fragmentary view of cross-section at the section line A—A in Fig. 5.

Figure 1:
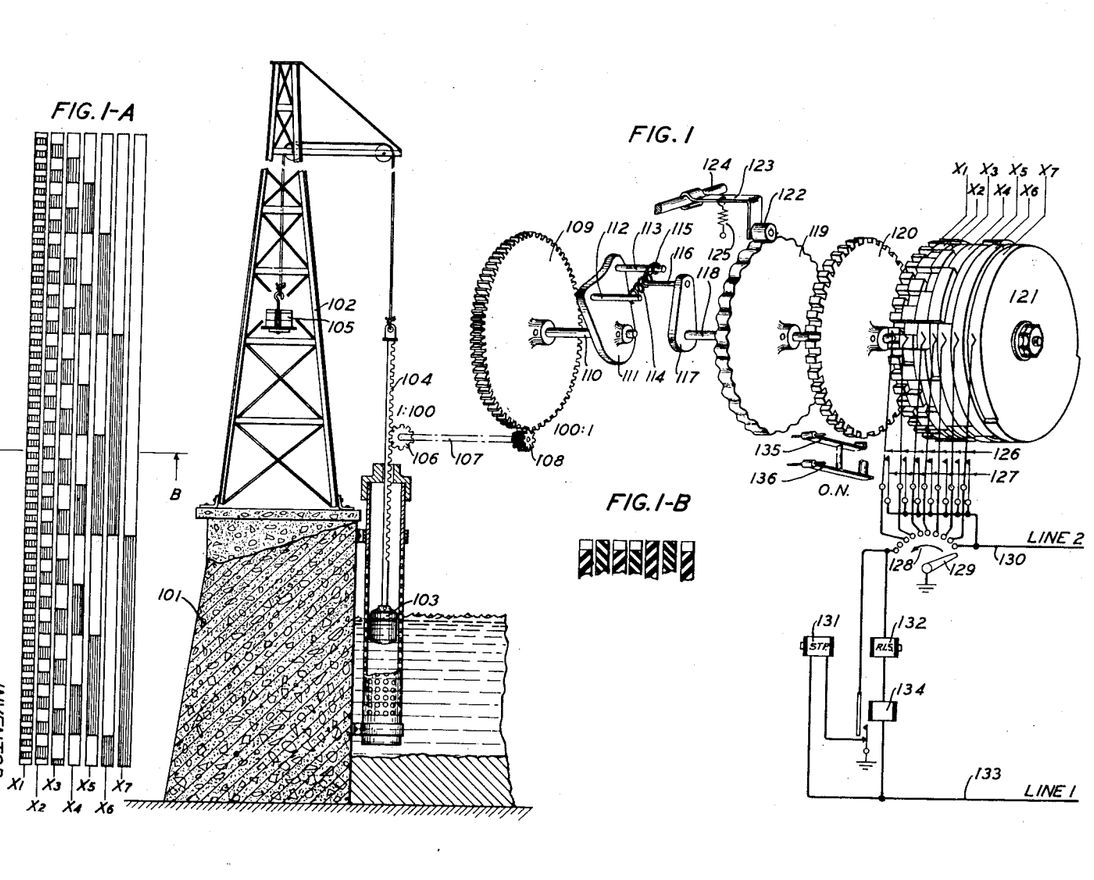
Fig. 1 shows the equipment at a reservoir or a dam where the request for liquid level measurements are received and the measurements are automatically taken and stored until changed.

Referring to Fig. 1, a reservoir of water is shown enclosed by wall 101, on top of which is erected a tall superstructure 102 for supporting a float 103 and a long rack bar 104 counterbalanced by a weight 105. The rack bar is arranged to move vertically in both directions under the influence of float 103 which rises and falls with the level of water in the reservoir. In engageable relation with the rack bar is a pinion 106 fixedly mounted on one end of shaft 107. For the purpose of the description herein, the full length of the toothed section of rack bar 104 in moving through one hundred steps or feet is assumed to cause pinion 106 to make one hundred revolutions. At the other end of shaft 107 is fixedly mounted another pinion 108 which is in engageable relation with gear 109. The ratio of the speed of rotation of pinion 108 to that of gear 109 is assumed in this case to be 100 to 1; that is, pinion 108 makes one hundred revolutions to one revolution of gear 109. Gear 109 is fixedly mounted on one end of shaft 110. On the other end of shaft 110 is fixedly mounted an eccentric disc 111 to which are attached two pins 112 and 113 as shown. Two coil springs 114 and 115 of equal size are respectively attached to the free ends of pins 112 and 113. The coil springs are connected at their free ends to a pin 116 which is fixedly mounted as shown on a second eccentric member 117. The second eccentric member 117 causes to rotate a shaft 118 to which are fixedly and coaxially mounted a jockey wheel 119, a stop disc 120 and a drum 121. The drum 121 consists of seven coaxially arranged rings, each ring having its periphery divided into segments and spaces respectively referred to herein as risers and depressions or high and low segments. Inasmuch as it is assumed herein that the float 103 may rise and fall through one hundred steps, the first ring $X_1$ is divided into one hundred alternate high and low segments of equal length. The second ring $X_2$ is similarly divided except that there are fifty alternately high and low segments of equal length, as shown. Likewise the rings $X_3$, $X_4$, $X_5$, $X_6$ and $X_7$ are also divided into high and low segments, as shown. In engagement with the periphery of each ring is a spring arranged to close and open a contact during the rotation of the drum, the points at which the springs are in engagement with their respective rings forming a straight line parallel with the axis of the drum. The jockey wheel 119 has along its periphery the same number of indents as there are steps to be registered by float 103, that is, if there are, as assumed herein, one hundred steps through which the float may rise and fall, there will be one hundred positions in which the jockey wheel may be positioned. In riding engagement with the jockey wheel 119 is a centering jockey 122 for determining the position in which the drum, after rotating, comes to rest. The jockey is a roller mounted on a support 123 which is pivoted to bar 124, the jockey being held in continuous engagement with the jockey wheel by coil spring 125. Stop disc 120 has a toothed periphery which in this case contains one hundred teeth, the number of teeth corresponding to the steps through which float 103 is assumed herein to rise and fall.

The seven springs 126 which are in engagement with the seven rotatable rings $X_1$, $X_2$, $X_3$, $X_4$, $X_5$, $X_6$, $X_7$, respectively, are arranged to open and close sending contacts 127 depending on whether the free ends of the springs rest on high or low segments of the rings, a different combination of closed contacts being provided in each of the one hundred positions of the drum. Springs 126 are respectively connected to the terminals of a selector switch 128, the wiper 129 of which is connected to ground. The selector switch is of the type that has an operating and a release magnet, the release magnet being effective to restore the wiper to normal in a single operation. The contacts 127 are connected to a signaling line 130. A rotary magnet 131, in response to current impulses received over the control or request line 133, operates the selector switch 128 and a release magnet 132 in response to the current received over the request line when the wiper 129 is on the tenth terminal of the switch, restores the switch to normal. A relay 134 operating in the operating circuit for release magnet 132 operates to disconnect ground from the operating circuit of rotary magnet 131 and to maintain ground for the operating circuit of release magnet 132 while wiper 129 is returning to normal.

In order to prevent any movement of sending device 121 while a combination of "current" and "no current" impulses are being transmitted over signaling line 130, a pivoted stop bar 135 is forced into engagement with a slot in the toothed stop disc 120 by a pivoted "off-normal" lever 136 which operates to its off-normal position as soon as the wiper 129 begins to operate. If any movement on the measuring device 103—106 takes place while the drum is held locked, it will be stored up in either of springs 114 or 115 depending on whether the direction of the movement is downward or upward. The above described mechanism therefore translates the position of the float to a position of the drum and insures that each position of the drum is definite and that the drum cannot move while transmission is taking place.

For the purpose of description it has been hereinbefore assumed that the above-described mechanism is arranged to measure height of water of one hundred feet but, as it will be hereinafter shown, the above-described mechanism is not limited to one hundred steps but the number of steps may be more or less as desired. The essence of the system herein described is that each step of foot-height of water that it is desired to indicate will have a corresponding permutated combination of "current" and "no current" impulses assigned to it. The combination may be transmitted to a central or observing point at predetermined intervals. The elements of the combination will operate electromagnetic relays at the observing point which will cause a meter to operate and thereby cause a record of the height of water in the reservoir to be printed on a teletypewriter at predetermined intervals as will be hereinafter described in detail.

In Fig. 1-A, which shows developed the cylindrical surface of drum 121, one hundred steps of water in foot-heights are indicated by one hundred positions on ring $X_1$. The high and low segments on the periphery of this ring $X_1$ respectively close and open the outermost left-hand contact 127. Simultaneously with the inter-engagement of the spring 126 or a high and low segment on ring $X_1$, each of the other six springs 126 is in engagement with the high or low segments on its respectively associated ring, the engaged segments on such other rings being those that form a straight line through the point of engagement on ring $X_1$. In the arrangement herein described every movement of one foot of the float 103 will cause the sending drum to move one step. If we assume that there is one quarter inch of the circumference of the drum for each step the drum will be about eight inches in diameter and will move one quarter inch for each movement of one foot of the float in upward or downward directions. Inasmuch as the drum comprises seven rings each one quarter inch of the cylindrical surface of the drum might be said to be divided into seven parts which will consist of rises and/or depressions depending upon the permutation combination of the step engaged at the time by springs 126. Figs. 1-A and 1-B show these rises and depressions, the black divisions indicating that a contact 127 is closed and the white divisions indicating that a contact 127 is opened.

Figure 2:
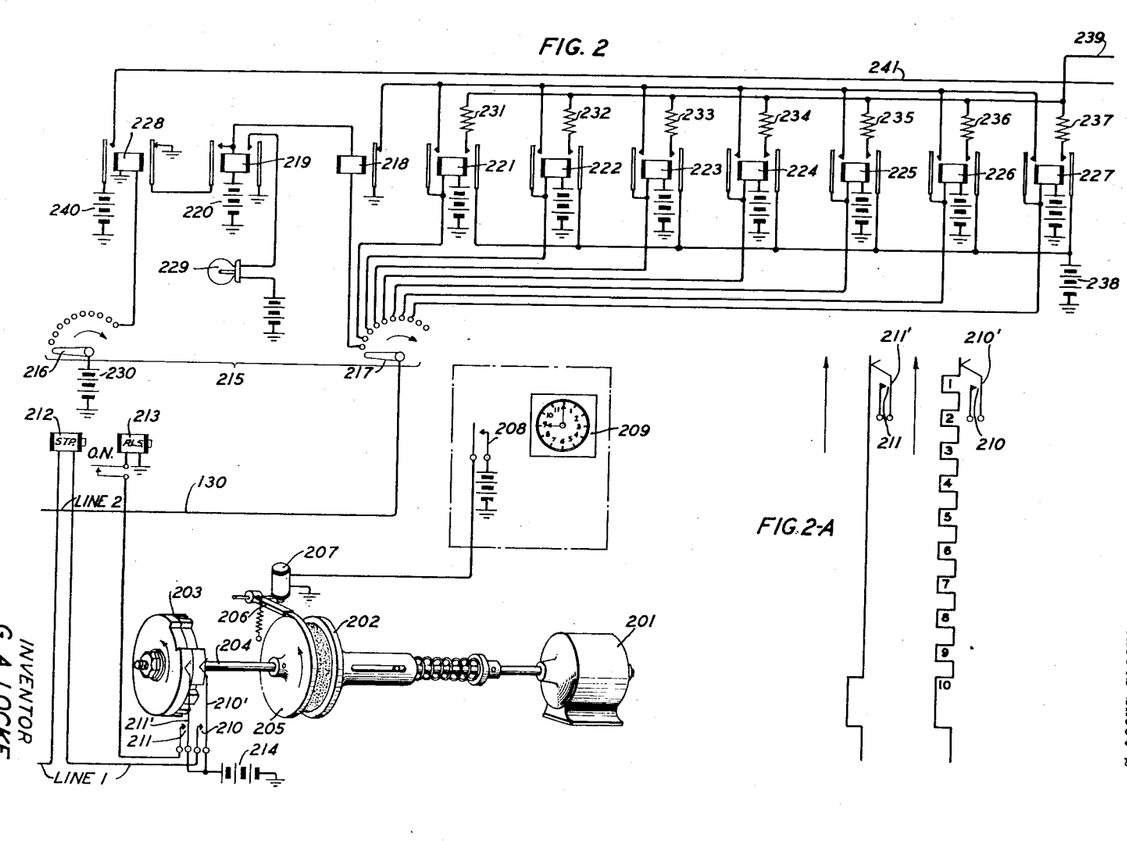
Figs. 2, 3 and 4 show the equipment at the central office from which the requests for liquid level measurements are automatically transmitted at regular intervals and whereat the impulses corresponding to the liquid level height are received and recorded on a teletypewriter.

It is generally desired that the power supply for operating the measuring and translating mechanism at the reservoir be located at a central office, the point of observation, and therefore the actuating or control impulses are transmitted from the central office shown in Fig. 2. In Fig. 2 reference is made to motor 201 for operating a driving plate 202 of a friction clutch. A synchronizing drum 203 is fixedly mounted on one end of shaft 204 and on the other end is fixedly mounted a driven plate 205 of the friction clutch. Drum 203, which is constituted of two rings insulated from each other and coaxially arranged on shaft 204, is normally held stationary by a pivoted latching member 206 controlled by a clutch magnet 207, the operating circuit of which extends over a pair of normally opened contacts 208. The timing contacts 208 may be controlled by a clock 209 and arranged to operate at any desired predetermined intervals. The closing of contacts 208 will operate clutch magnet 207 and permit the driven plate 205 to rotate drum 203. One of the rings of drum 203, that is, the right-hand ring, has on its periphery ten rises and ten depressions alternately arranged to close and open contacts 210 ten times in rapid succession, during a single revolution of the drum. The last depression whereat the contacts 210 are closed, is approximately three times the length of any one of the other nine depressions, which are of equal length. This arrangement of rises and depressions, as will be hereinafter described, causes nine short current impulses and one long current impulse to be transmitted to the mechanisms at both the central office and the reservoir during each revolution of drum 203. The other of the rings of drum 203, that is the left-hand ring, has on its periphery one long riser and one depression having a length equal to three unit lengths of depressions of the right-hand ring, the three-unit length depression beginning at the same point or time as the beginning of the tenth depression on the right-hand ring. Fig. 2-A shows the relative positions of the rises and depressions on the right- and left-hand rings.

Immediately after the start of rotation of timing impulse device 203, brush 210' drops into the first depression and closes a current from grounded battery 214, over contact 210, through the winding of rotary magnet 212 of selector switch 215, the request line 133, through the winding of rotary magnet 131 of selector switch 128, normally closed contact of relay 134 to ground. The first short impulse operates magnets 212 and 131 to rotate wipers 129, 216 and 217 of their respective selector switches 128 and 215 to their respective associated first terminals. Brush 210' then engages its first riser and the operating circuit for the rotary magnets is opened. Brush 210' then passes on to the second depression and again the operating circuits for the rotary magnets is closed to move the wipers 129, 216 and 217 to their respectively associated second terminals. This operation continues during the revolution of drum 203 until the tenth depression is engaged by brush 210'. When the brush 210' engages its tenth depression, the brush 211' engages the depression on the left-hand ring and two additional circuits are closed, one extending over the request line 133 through the winding of relay 134 and release magnet 132, in series, of selector switch 138 to the tenth terminal of selector switch 128, wiper 129 to ground, and the other from grounded battery 214, contact 211, the "off-normal" contact of switch 215 through the winding of release magnet 213 of selector switch 215 to ground. The first-mentioned circuit of the two additional circuits operates relay 134 and releases magnet 132 whereby ground at the armature and contact of the relay is transferred from the operating circuit for rotary magnet 131 to a locking circuit for release magnet 132 and the wiper 129 is consequently returned to normal in one operation. The second-mentioned circuit of the two additional circuits operates release magnet 213 to cause the wipers 216 and 217 to also return to normal in one operation and open the "off-normal" contact.

The sending drum 121 at the reservoir having been positioned by float 103 to close a combination of contacts 127 corresponding to the height of water in the reservoir, causes to be transmitted over signaling line 130, during the time that wiper 129 is rotating from its first to its tenth terminal, a combination of "current" and "no current" signal impulses which are received over the terminals engaged by wiper 217 simultaneously with the engagement of corresponding terminals by wiper 129. When the wiper 129 engages its first associated terminal a circuit is closed from ground, wiper 129, first terminal on switch 128, signaling line 130, wiper 217, on its associated first terminal, through the windings of relays 218 and 219, in series, to grounded battery 220. Relays 218 and 219 operate. Relay 218 operates momentarily in order to release any of the electromagnets or relays 221, 227, inclusive, which may happen to be in an operated condition at the time, but relay 219 operates and locks in a circuit traceable to ground at the right-hand armature and contact of relay 228. Relay 219 in operating closes at its right-hand armature and contact, a circuit for operating lamp 229, which when lighted indicates that a measurement is being transmitted from the reservoir and the mechanisms at both the central office and the reservoir are operating. When wiper 129 engages its associated second terminal, a circuit is prepared from ground, wiper 129, contact 127 that is connected to the second terminal, signaling line 130, wiper 217 and its associated second terminal, through the winding of relay 221, to grounded battery. If the contact 127 that is connected to the second terminal of switch 128 is closed in the position in which drum 121 is set at the time, relay 221 will operate, but if the particular contact 127 is not closed, relay 221 will not operate. If relay 221 operates, it will close a locking circuit for itself extending over its left-hand armature and contact to ground at the armature and contact of relay 218. Further steps of the synchronized selector switches 128 and 215 will test the rest of contacts 127 at the reservoir and relays 222 to 227, inclusive, will operate or not operate depending on the position of their respectively associated sending contact 127. When wiper 129 engages its tenth terminal, release magnet 132 operates and locks in its operated position to restore wiper 129 to its normal position as hereinbefore described. The restoration of wiper 129 to its normal position releases the off-normal lever 136 and pivoted stop bar 135 to thereby release drum 121 for the next change in water level in the reservoir. When wiper 216 engages its associated tenth terminal, it will apply grounded battery 230 to the winding of relay 228. Relay 228 operates and thereby releases relay 219 causing lamp 229 to be extinguished. Selector switch 215 is restored to normal by the operation of release magnet 213 as hereinbefore described.

Figures 4, 5:
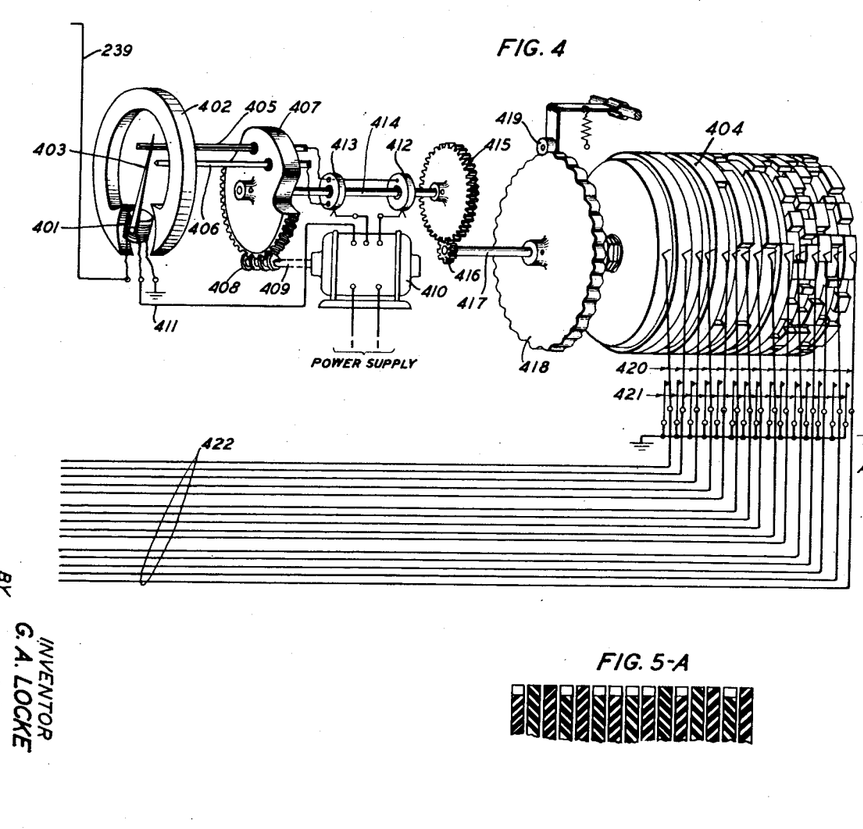
Fig. 5 shows developed the surface of a cylindrical drum mounted on the right-hand end of the shaft shown in Fig. 4.
Figure 5:
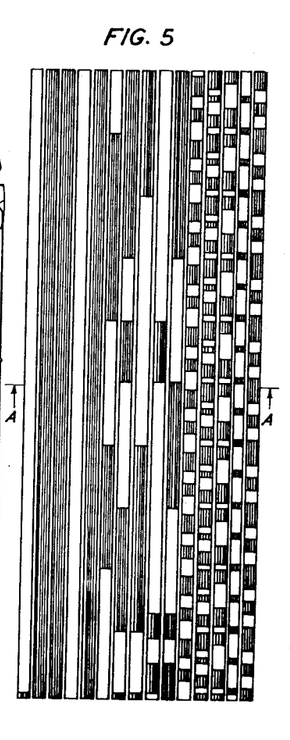

The operation of the system has now reached the point where the position of drum 121 has been transmitted to the relays 221 to 227. Relays 221 to 227 may be operated to form one hundred and twenty-eight different permutated combinations. By increasing the number of rings on drum 121 and the number of relays in the group now comprising relays 221 to 227 a greater number of combinations may be had although in the system herein described a hundred combinations are sufficient to transmit measurements of one step or foot to one hundred steps or feet. The operation of relays 221 to 227 closes indicator circuits extending from grounded battery 238, over parallel impedance paths closed at the right-hand armatures and contacts of the operated relays 221 to 227, conductor 239 through the rotatable coil 401 to ground. The coil 401 is positioned in the magnetic field produced by the magnet of galvanometer 402 and is subject to rotation in either direction under the influence of the current received over conductor 239. The value of the current received over conductor 239 depends on the number of resistances 231 to 237 that may be included in the operating circuit for coil 401. In this connection the resistances 231 to 237 may be adjusted to allow different currents to flow and the combined current of any of the paths including their respective resistances, that may be closed by the relays 221 to 227, serves to rotate coil 401 in either direction to thereby operate the pointer 403 sufficiently to rotate a translator drum 404 to a position corresponding to the current condition produced by the combination of operated relays 221 to 227. For example the resistances 231 to 237 may be adjusted to allow the following current to flow, the values of the resistances, of course, depending upon the voltages used:

Resistance 231=.001 ampere
Resistance 232=.002 ampere
Resistance 233=.004 ampere
Resistance 234=.008 ampere
Resistance 235=.016 ampere
Resistance 236=.032 ampere
Resistance 237=.064 ampere If the combination for zero feet at the reservoir is present on the relays 221 to 227 none of them will be operated and the pointer 403 will cause drum 404 to rotate until its zero position is in contact with brush 420. If one foot is to be indicated, relay 221 will be operated and drum 404 will be caused to rotate until its first position engages brushes 420. If twenty feet is to be indicated, relays 223 and 225 will be operated and the resultant current condition in conductor 239 will be .004 ampere plus .016 ampere combined to cause drum 404 to be rotated until brushes 420 are in engagement with its twentieth position.

The means for operating or rotating drum 404 is controlled by pointer 401 which in rotating in either direction under the influence of coil 401 engages either of two contact members 405 or 406 which are insulatedly extended through a gear member 407 having a toothed section extending over a portion only of the periphery. The toothed section is in engagement with the worm gear 408 which is fixedly mounted on the free end of the driving shaft 409 of motor 410. The motor is operable in either direction, depending on whether the point 403 engages one or the other contact member 405 or 406. The circuit of contact member 405 is traceable from one side of the power supply through the motor winding (not shown) conductor 411, pointer 403, contact member 405, slip ring 412, and its associated brush, through the motor winding to the other side of the power supply. The circuit of contact member 406 is the same as that of contact member 405 except that the pointer 403 extends in circuit over the contact member 406, slip ring 413, and its associated brush through the motor winding, the current in one of the circuits just described causing the motor to rotate in the opposite direction of that due to the current in the other circuit. Slip rings 412 and 413 are insulated and fixedly mounted on shaft 414 which is rotated in either direction by motor 410 through the joint action of worm gear 405 and gear 407. On the free end of shaft 414 is fixedly mounted a gear 415 which engages a pinion 416. The speed ratio of gear 415 to pinion 416 is assumed herein to be 1 to 2, but inasmuch as gear 415 rotates only through the same distance as gear member 407, that is about one half revolution, at the most, pinion 416 will be able to rotate one complete revolution. Pinion 416 is fixedly mounted on shaft 417 to which is fixedly mounted a jockey wheel 418 and a drum 404. The rotation of gear 415 through a half revolution is, therefore, capable of rotating the jockey wheel 418 and drum 404 through one hundred steps, the centering of the drum 404 on any one of its one hundred steps being provided by means of pivoted centering jockey 419.

Drum 404 is constituted of fifteen coaxially arranged insulated rings there being provided five rings for each character of a three character number of units, tens and hundreds. Each ring, like those of drum 121, has a number of risers and depressions at its periphery shown developed in Fig. 5. In engagement with each ring of drum 404 is a brush, the brushes being aligned in a plane that is tangent to the drum. The relative positions of the risers and depressions taken across the drum at section line A—A of Fig. 5, is shown in Fig. 5-A. In engageable relation with the fifteen brushes for drum 405 is a group of fifteen translating contacts 421. The brushes 420 respectively engage contacts 421 in various permutated combinations depending on the position of rest assumed by translator drum 404 under the control of the current received over conductor 239. The closing of any brush with its associated contact closes a printer operating circuit from ground over one of the conductors 422 through the winding of its corresponding relay in group $a$, $b$ or $c$ to grounded battery at the outer right-hand armature and contact of the relay 301, which operated and locked when wiper 216 made contact with the tenth terminal of selector switch 215 whereby relay 228 operated to connect grounded battery 240 to conductor 241. The storing relay groups $a$, $b$ and $c$, respectively, correspond to the three characters of any three character number, there being for each group, five relays to correspond to the combination of five impulses of each telegraphic signal.

Figure 3:
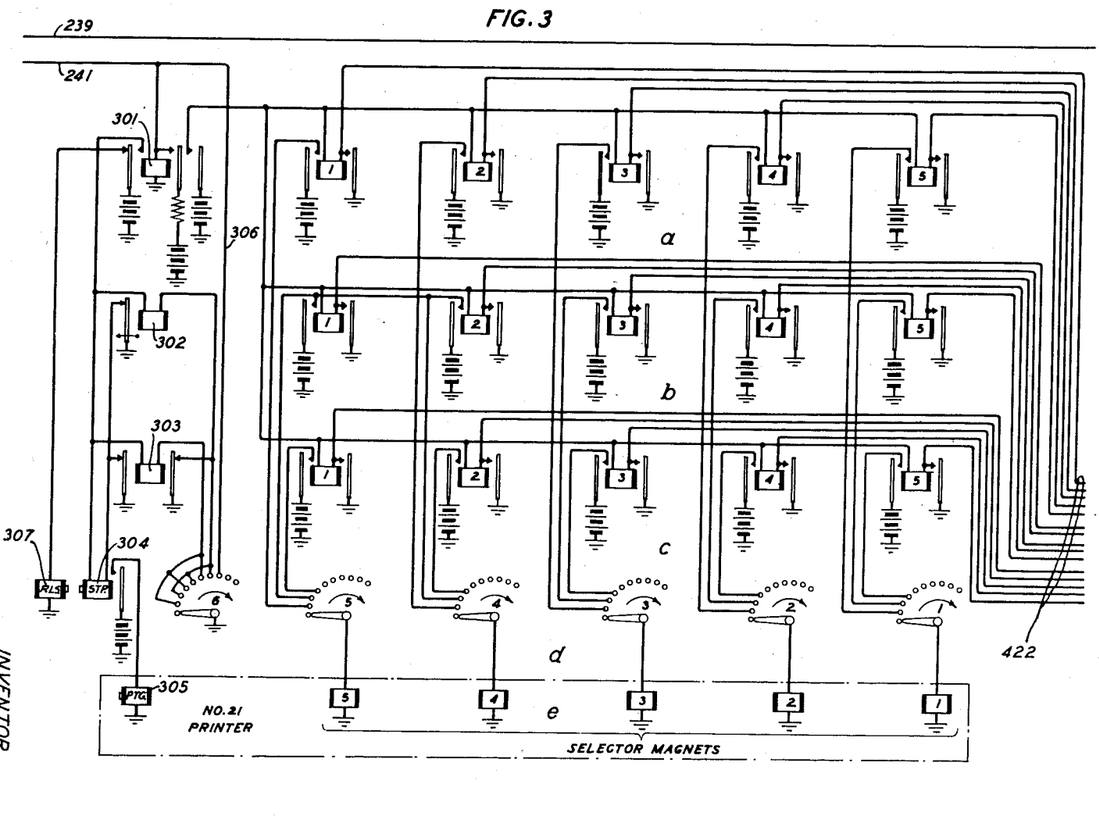

Relay 301 in operating locks in a circuit extending to grounded battery over its inner right-hand armature and contact, and, as stated above, connects at its outer right-hand armature, grounded battery to the windings of each of the relays of the $a$, $b$ and $c$ groups, shown in Fig. 3. However, only those relays of groups $a$, $b$ and $c$ will be operated that have the opposite side of their windings connected over conductors 422 to contacts 421 that are in engagement with brushes 420 because of the position into which drum 404 is rotated to correspond to the height of water in the reservoir. Relay 301 in operating, also connects grounded battery at its left-hand armature and contact to a circuit comprising three parallel paths, the first, through the winding of control relay 302 to ground at the right-hand armature and contact of relay 303; second, through the winding of control relay 303 to the second, fourth and sixth contacts connected in multiple on switch bank $d$—6; and third, through the winding of stepping magnet 304 to ground at the left-hand armature and contact of relay 302 or 303. When relay 301 operates the first and third paths close and relay 302 and stepping magnet 304 operates. Stepping magnet 304 in operating causes the wipers 1 to 6, inclusive, of printer switch $d$ to move into engagement with their respectively associated second contacts. One or more operated storing relays in group $a$ now close a circuit to grounded battery over their respective left-hand armature and contact, the second contacts of switch banks $d$—5, $d$—4, $d$—3, $d$—2, and $d$—1 and their respective wipers through the windings of corresponding selector magnets of printer $e$ to ground. The one or more operated selector magnets are now prepared to print the first character of the three character number which indicates the height of water in the reservoir. The presence of the wiper of selector switch bank $d$—6 on its second terminal will operate relay 303 thereby releasing relay 302 and stepping magnet 304. The armature of relay 302 will now fall back, but the relay being of the slow-release type, this will take a certain time. When relay 302 is restored to normal, stepping magnet 304 becomes reenergized and thereby causes the printing of the first character stored on selector magnets of printer $e$ and the stepping of the wipers on switch banks $d$—1 to $d$—6 to their respective third terminals. When the wipers engage their third terminals on selector switch $d$, the circuits prepared over the left-hand armatures and contacts of the operated relays of group $b$ will be closed to ground through the windings of the corresponding selector magnets of printer $e$; the stepping magnet 304 releases when relay 302 operates for the second time and slow release relay 303 begins to release. The complete release of relay 303 again causes stepping magnet 304 to operate to thereby step the wipers of selector switch $d$ to the fourth terminals, and cause the selector magnets of printer $e$ to operate in accordance with the operated relays of group $c$. The third character of the three character number which is stored in the selector magnets of printer $e$ is recorded in the manner described above. Thus selector switch $d$ will step six times to operate; the selector magnets in accordance with battery connections to its switch banks on the fifth terminal returning the printer carriage; on the sixth terminal feeding the paper on the printer; and on the seventh terminal giving the "figures" shift insuring that the printer is in the "figures" position. On the eighth terminal relay 301 will be short-circuited by a path extending over conductor 306 to ground on the wiper of switch bank $d$—6 and will therefore release because its operating circuit has been opened by the previous release of relay 228. The release of relay 301 closes the operating circuit of release magnet 307 which operates to release the selector switch $d$ which like selector switches 128 and 215 is of the type which is restored to normal in one operation.

Thus each position of drum 404 may be recorded on printer $e$. For instance, if drum 404 is in its twentieth position or what might be termed step No. 20, relays $a$—2 and $a$—3 and $a$—5 of group $a$, relays $b$—1, $b$—2 and $b$—5 of group $b$ and relays $c$—2, $c$—3 and $c$—5 of group $c$ will be operated and locked. When the wipers on selector switch banks $d$—5, $d$—4, $d$—3, $d$—2, and $d$—1 engage their respectively associated second terminals, the selector magnets 4, 3 and 1 of printer $e$ operate to print the character 0. When the wipers rotate to their respectively associated third terminals, the operated relays of group $b$ cause selector magnets 5, 4 and 1 of the printer to operate and thereby print the character 2. When the wipers rotate to their respectively associated fourth terminals, the operated relays of the $c$ groups cause selector magnets 4, 3 and 1 to operate and thereby print the character 0.

The printer suitably adapted for use in the system herein described may be of the type disclosed in United States Patent 1,565,165, granted to E. E. Kleinschmidt on December 8, 1935. It should be understood, however, that other types of printers may be used.

What is claimed is:

1. A system for indicating measured quantities of a changeable mass comprising means for translating each of the measurements of said quantities into a combination of electrical current impulses, a second means for translating said combination of electrical current impulses into a plurality of combinations of electrical current impulses, and a recording device responsive to said plurality of combinations for giving, whenever desired, a permanent record in quantitative terms, of the changed mass.

2. An indicating system for measuring changeable quantities comprising a plurality of electrical contacts, a movable member cooperating therewith to open and close said contacts in combinations in accordance with the changes in said mass, a signaling circuit connected to said contacts, a request circuit, timing means for alternately energizing and deenergizing said request circuit, first switching means responsive to said alternate energization and deenergization of said request circuit and arranged to operate through a series of steps to thereby transmit over said signaling circuit combinations of current impulses respectively corresponding to the combinations of said open and closed contacts, second switching means simultaneously responsive with said first switching means to the alternate energization and deenergization of said request circuit and arranged to operate through a series of steps corresponding to the series of steps of said first switching means, a plurality of electromagnets selectively responsive to each combination of impulses received over said second switching means, translating means responsive to the selectively operated electromagnets for translating each of said combinations of impulses into a telegraphic code, and a recording device responsive to said telegraphic code for giving a quantitative indication of the changed quantity.

3. An indicating system according to claim 2, wherein said recording device comprises a teletypewriter and said translating means is adapted for translating each combination set up on said electromagnets into a group of combinations of current impulses representing a telegraphic code suitable to operate said teletypewriter to thereby produce in a quantitative term of one or more digits a printed record of the changed mass.

4. An indicating system comprising, a plurality of electromagnets operable in response to incoming signaling impulses in different combinations, a circuit comprising a plurality of paths for producing a control current of a strength depending on the combination of said paths set up by said electromagnets, operating means responsive to the total current received over said closed paths to operate a corresponding distance, a contact device adapted to be rotated to any one of a plurality of positions under the control of said operating means, and including a plurality of contact means operable into corresponding different combinations, a plurality of circuit means connected to said contact means for converting each contact combination into a plurality of simultaneous current combinations representing a telegraphic code, printer means adapted to be connected to said plurality of circuit means for recording a printed character for each of said converted combinations.

5. An indicating system for remote recording of measurements of a varying quantity comprising a measuring member responsive to variations in said quantity, a contact controlling device comprising a number of sending contacts and a ring of operating segments for each of said contacts, said rings having different numbers of segments, driving means intermediate said measuring member and said contact controlling device whereby said contacts are operated in different combinations, a central office remote from said sending contacts, a line circuit between said sending contacts and said central office, step-by-step switching means responsive to a signal from said central office for causing to be transmitted over said line circuit from said contacts to said central office current impulses, a plurality of electromagnets at said central office corresponding in number to said contacts and responsive to said current impulses, a second contact controlling device arranged to rotate to one of a plurality of positions depending on the combination of said electromagnets responding to said current impulses and comprising a plurality of translating contacts and a ring of operating segments for each of said contacts, said latter rings having different numbers of segments and the contacts and rings being arranged in groups, groups of relay circuit means controlled by each of the positions of said groups of translating contacts for converting by means of said groups of rings the combinations set up on said electromagnets into groups of combinations of telegraph impulses, and a printer responsive to each of said groups of combinations of telegraph impulses for recording a character.

6. An indicating system for remote recording of measurements of a varying quantity, such as the height of level of a liquid supply at a reservoir comprising a measuring member responsive to variations in said quantity, a first cam member rotatable into a plurality of positions corresponding in number to the steps between the minimum and maximum values of said quantity, driving means connected between said measuring member and said cam member, a plurality of sending contacts operable by said first cam member in different combinations in all of said positions, circuit paths respectively controlled by said sending contacts, a signal circuit connected in common to said paths, a first switching device for connecting each of said paths in consecutive order with said signal circuit, a stepping circuit for controlling the operation of said first switching device, a distant recording station, timing means at said distant station for alternately energizing and deenergizing said stepping circuit, a second switching device located at said distant station and simultaneously controlled by said stepping circuit, other circuit paths connected to said signal circuit in sequential order through said second switching device, a plurality of electromagnets respectively connected in said other paths and corresponding in number to said plurality of sending contacts, parallel paths of different resistances including operating contacts on said electromagnets, a meter connected to said parallel paths for operation into different indicating positions in accordance with the combined resistance of said paths, a second cam member rotatable into a plurality of positions corresponding to the positions of said meter, driving means for said second cam member controlled by said meter, and a plurality of translating contacts operable by said second cam member in different combinations, a plurality of storing relay means connected to said translating contacts, a telegraph printer, a third switching device controlled by said second switching device to connect said storing relay means in successive groups to said printer for recording of a character in accordance with the set-up of each connected group of storing relays by said translating contacts.

7. An indicating system for remote recording of measurements of a varying quantity, such as a changing water level, which comprises a measuring member responsive to variations in said quantity, a rotatable cam member, driving means for rotating said drum in accordance with the operation of said measuring member, locking means for centering said cam member in definite positions, a plurality of sending contacts operable in different combinations by said cam member, a request circuit, an answer circuit, control means automatically operated at intervals for transmitting over said request circuit a series of control impulses, first switching means responsive to said control impulses for connecting each of said sending contacts in turn to said answer circuit, second switching means simultaneously responsive with the first switching means to the control impulses, a plurality of electromagnets corresponding in number to said sending contacts, said first and said second switching means being jointly effective to operate one or more of said electromagnets in accordance with the operated sending contacts, an indicator circuit comprising a plurality of different resistive paths closed by said electromagnets in operated positions, an indicator responsive to the accumulated currents of one or more resistive paths in said indicator circuit to be operated into a plurality of different positions, a second cam member arranged to be rotated into different positions under control of said indicator, a plurality of translating contacts arranged to be operated in various combinations by said second cam member depending on the position of said second cam member, a plurality of groups of relay means connected to said translating contacts, each group being arranged to operate in various combinations in response to the operated translating contacts, a telegraph printer adapted to be connected to each of said groups of relay means for translating the combinations set up on said relay means into a plurality of printed characters.

8. Apparatus for recording in the form of printed characters variations in a liquid level comprising a measuring member responsive to said variations, a rotatable sending device controlled by said member and arranged to move into any one of a plurality of positions, a plurality of sending contacts arranged to open and close in a plurality of combinations, one for each position of said rotatable device, a rotatable timing device for transmitting at intervals of time control impulses, a plurality of automatically operated stepping switches connected to be simultaneously responsive to said control impulses, a plurality of electromagnets connected to successive terminals of one of said stepping switches and said plurality of sending contacts being connected to successive terminals of another of said stepping switches, said electromagnets being operable into different combinations in accordance with the combinations set up on said sending contacts during the operation of said stepping switches, a galvanometer having a rotatable coil and an indicator attached thereto, a circuit including said coil and having a plurality of paths arranged to be closed by the operation of said electromagnets, said coil being effective to move said indicator a distance depending upon the combination of closed paths, a rotatable translating device arranged to move under control of said indicator into any one of a plurality of positions and including a plurality of translating contacts arranged to open and close in different combinations in the different positions of said translating device, a plurality of groups of storing relay means connected to corresponding ones of said translating contacts and arranged to be operated thereby in various combinations, control relay means responsive to one of said stepping switches, printer switching means controlled by said control relay means, and a telegraph printer responsive to each group of said storing relay means in turn through said printer switching means to produce a record of the liquid level in printed characters, one for each group of storing relay means.

GEORGE A. LOCKE.